United States Patent Office 3,282,917
Patented Nov. 1, 1966

3,282,917
METHYL N-(1-ALKYL-4-ALKOXY-PROLYL)-α-THIOLINCOSAMINIDE COMPOUNDS AND PROCESS THEREFOR
Barney J. Magerlein, Portage, Mich., assignor to The Upjohn Company, Kalamazoo, Mich., a corporation of Delaware
No Drawing. Filed Aug. 17, 1964, Ser. No. 390,176
9 Claims. (Cl. 260—210)

This invention relates to novel compositions of matter and is particularly concerned with novel methyl N-(1-alkyl-4-alkoxyprolyl)-α-thiolincosaminides, the intermediates, 1-alkyl-4-alkoxyprolines, therefor and a process for the production thereof.

The products of this invention and the process for the production thereof can be illustratively represented by the following sequence of formulae:

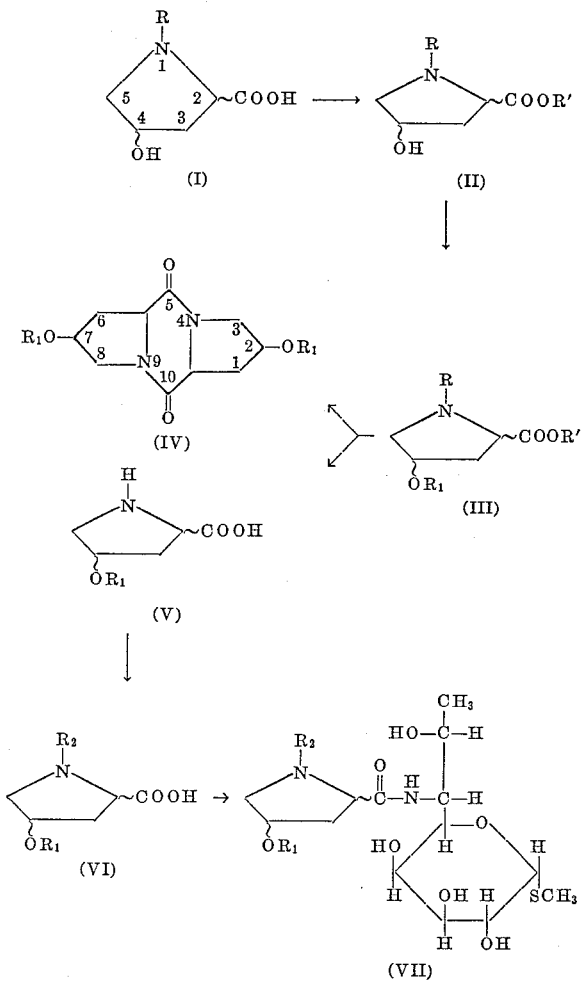

wherein R is a protective hydrocarbyloxycarbonyl group which is removable by catalytic hydrogenolysis, wherein R' is selected from the group consisting of alkyl having from 1 to 8 carbon atoms, inclusive, and aralkyl having from 1 to 9 carbon atoms, inclusive, and wherein $R_1$ and $R_2$ are alkyl radicals having from 1 to 12 carbon atoms, inclusive.

The significance of the wavy line linkage "∼" is that the groups thus attached to the pyrrolidine ring may be above or below the plane of the ring. Therefore the starting compound I as well as compounds II, III, V, VI and the proline moiety of VII can exist in four stereoisomeric forms: trans-L, trans-D and cis-L and cis-D.

The protective hydrocarbyloxycarbonyl groups, R, which are removable by hydrogenolysis, include particularly carbobenzoxy groups of the formula

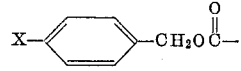

wherein X is selected from the group consisting of hydrogen, nitro, methoxy, chloro and bromo. Examples of such groups are carbobenzoxy, p-nitrocarbobenzoxy, p-bromo- and p-chlorocarbobenzoxy. Other useful protective groups include phenyloxycarbonyl groups of the formula

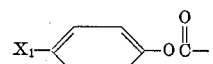

wherein $X_1$ is selected from the group consisting of hydrogen and alkyl containing from 1 to 4 carbon atoms, inclusive, such as phenyloxycarbonyl, p-tolyloxycarbonyl and p-ethylphenyloxycarbonyl; and allyloxycarbonyl and the like.

In addition, other substituents which are not hydroxycarbyloxycarbonyl groups can be utilized as protective groups and removed by catalytic hydrogenolysis, e.g., triphenylmethyl, benzyl and p-nitrobenzyl.

The process of the present invention comprises: treating a 1-hydrocarbyloxycarbonyl-4-hydroxyproline (I) with an alcohol such as benzyl alcohol, diphenylmethanol, in the presence of an acid catalyst such as toluenesulfonic acid to obtain the corresponding ester of 1-hydrocarbyloxycarbonyl-4-hydroxyproline (II); treating the ester (II) with a selected alkyl iodide and a base such as silver oxide to obtain the corresponding 1-hydrocarbyloxycarbonyl-4-alkoxyproline ester (III); hydrogenolyzing compound III in the presence of a palladium catalyst on a suitable carrier to a mixture of 2,7-dialkoxyoctahydro-5H,10H-dipyrrolo[1,2-a:1',2'-d]pyrazine-5,10-dione (IV) and 4-alkoxyproline (V); separating compound V from the mixture and treating it with a carbonyl compound of the formula

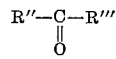

wherein R" and R''' are selected from the group consisting of hydrogen and alkyl in which the total number of the carbon atoms in the alkyl groups is up to and including 11 carbon atoms, e.g., formaldehyde, acetaldehyde, acetone and the like, and hydrogenating in the presence of a palladium-on-carrier catalyst to a 1-alkyl-4-alkoxyproline of Formula VI, in which the alkyl groups $R_1$ and $R_2$ have from 1 to 12 carbon atoms, inclusive; and treating compound VI with triethylamine and isobutylchloroformate and thereafter with methyl α-thiolincosaminide to obtain the corresponding methyl N-(1-alkyl-4-alkoxyprolyl)-α-thiolincosaminide (VII).

The new compounds, methyl N-(1-alkyl-4-alkoxyprolyl) - α - thiolincosaminides are useful, antibacterial compounds, active against a variety of bacteria. They are particularly active against Sarcina lutea and Leuconostoc mesenteroides. Organisms of the Leuconostoc genus, particularly Leuconostoc mesenteroides, ferment in fruit juices; it presents a problem especially in the processing of orange juice, where it imparts a disagreeable flavor to the juice. The above-shown methyl N-(1-alkyl-4- alkoxyprolyl))-α-thiolincosaminides of Formula VII are highly active against this organism and can thus be used for the cleansing and sterilization of apparatus and equipment used in the process of making canned and frozen orange juice as well as other fruit juices. The compounds of Formula VII, moreover, can be used in cleansing of floors, walls and ceilings in rooms where such food processing takes place and can also be used for cleansing of instruments used in laboratories in which bacteria are handled.

The new 1-alkyl-4-alkoxyprolines are novel intermediates useful in the production of the antibiotically active methyl N-(1-alkyl-4-alkoxyprolyl)-α-thiolincosaminides.

The starting materials of Formula I are prepared from 4-hydroxyprolines by reacting a 4-hydroxyproline sodium salt, obtained by dissolving 4-hydroxyproline in aqueous sodium hydroxide, with, for instance, a phenyl- or a benzylchloroformate. The preparation is shown in detail by A. A. Patchett et al., J. Am. Chem. Soc. 79, 185 (1957). Isomeric 1-hydrocarbyloxycarbonyl-4-hydroxyprolines can also be prepared by reducing 1-hydrocarbyloxycarbonyl-4-ketoprolines with sodium borohydride, lithium borohydride, and the like (A. A. Patchett, ibid.).

In carrying out the process of the present invention, a selected 1-hydrocarbyloxycarbonyl-4-hydroxyproline is esterified with an alcohol, generally in the presence of an acid catalyst. Alcohols used in this reaction may be methyl, ethyl, propyl, isopropyl, amyl, hexyl, octyl, cyclohexyl, benzyl and the like alcohols. Benzyl alcohol is preferred since the benzyl group is easily removed by hydrogenolysis simultaneously with the hydrocarbyloxycarbonyl group. If other alcohols are used, the ester must be hydrolyzed, for example with a base such as sodium carbonate, bicarbonate, or hydroxide, thus necessitating an additional step. In the preferred embodiment of this invention, the selected 1 - hydrocarbyloxycarbonyl - 4 -hydroxyproline is heated in a solvent such as benzene or toluene with the alcohol, preferably benzyl alcohol, under reflux for a period of 1 to 48 hours in the presence of 0.2 to 2% of an acid catalyst, such as p-toluenesulfonic acid, sulfuric acid or the like. At lower temperatures, the reaction time is substantially increased. Other solvents can be used, such as cyclohexane, methylcyclohexane, Skellysolve B (isomeric hexanes), heptanes, and the like. At the termination of the reaction, the product is recovered by conventional means.

The oily ester without further purification can be used in the next step, etherification. For this purpose, the 1-hydrocarbyloxycarbonyl - 4 - hydroxyproline ester as obtained above is dissolved in an organic solvent, preferably a dialkyl alkan amide such as dimethylformamide, diethylformamide, diethylacetamide, and the like, and thereto is added a selected alkyl halide in excess. The alkyl halides herein employed are particularly the iodides such as methyl, ethyl, propyl, isopropyl, butyl, isobutyl, pentyl, hexyl, heptyl, octyl, nonyl, decyl, undecyl, dodecyl, and the like iodides. The corresponding bromides are also employed and, to a lesser extent, the chlorides. In the preferred embodiment of this invention, the proline ester (II) in the solvent is reacted with a 2 to 8 molar excess of alkyl halide in the presence of a base, preferably silver oxide or silver carbonate in a quantity sufficient to react with the hydrogen halide liberated in the reaction. The reaction time varies between 6 hours and 5 days at temperatures between 20 and 30° C. At the termination of the reaction, silver halide and excess silver oxide or carbonate is removed by filtration and 1-hydrocarbyloxycarbonyl-4-alkoxyproline ester (III) is isolated by conventional methods, such as distillation to remove the solvent.

The thus-obtained 1-hydrocarbyloxycarbonyl-4-alkoxyproline ester is hydrogenolyzed in the presence of a palladium catalyst. Five to ten percent palladium-on-charcoal is preferred. Five to forty-five pounds of hydrogen pressure is sufficient for this reaction, but higher or lower hydrogen pressures can be employed. At the end of the reaction the catalyst is removed by filtration and the mixture distilled in vacuo. Two products are obtained, 4-alkoxyproline and 2,7-dialkoxy - octahydro - 5H,10H - dipyrrolo [1,2-a: 1′,2′-d]pyrazine-5,10-dione. These products are separated by conventional means, most commonly by utilizing differences in solubility, such as by precipitating the 4-alkoxy-L-proline from a methanol solution by the addition of acetonitrile and evaporating the filtered mother liquor to obtain the 2,7 - dialkoxyoctahydro-5H,10H-dipyrrolo[1,2-a:1′,2′-d]pyrazine-5,10-dione.

The thus-obtained 4-alkoxyproline (V) is dissolved in methanol and is reductively alkylated in the presence of a carbonyl compound of the formula R″—CO—R‴, wherein R″ and R‴ are selected from the group consisting of hydrogen and alkyl, in which the alkyl groups have together not more than 11 carbon atoms. The carbonyl compounds, aldehydes and ketones, used in this reaction include formaldehyde, propionaldehyde, acetaldehyde, butyraldehyde, valeraldehyde, hexanal, heptanal, octanal, decanal, lauraldehyde, acetone, diethyl ketone, dibutyl ketone, methyl ethyl ketone, pentyl hexyl ketone, and the like. The reductive alkylation in the preferred embodiment of this invention is carried out at room temperature (20 to 30 C.), and in the presence of a palladium catalyst such as a 10% palladium-on-charcoal catalyst. At the termination of the reaction the material is filtered to remove the catalyst and the filtrate is evaporated to give a 1-alkyl-4-alkoxyproline (of Formula VI). The crude product thus obtained can be purified by recrystallization from methanol, ethanol, butanol and other alkanols.

The thus-obtained 1-alkyl-4-alkoxyproline is condensed with the amino sugar fraction of the recently discovered antibiotic lincomycin, namely methyl α-thiolincosaminide. In the preferred embodiment of this invention this condensation reaction is carried out in solution at low temperature using acetonitrile as solvent. The 1-alkyl-4-alkoxyproline, in acetonitrile, is reacted with isobutylchloroformate and triethylamine and the mixture after a short period of stirring at 0° is reacted with methyl α-thiolincosaminide dissolved in water. The reaction is carried out at a temperature between minus 5° C. and room temperature, with the lower part of the temperature range preferred at the beginning of the reaction. The time to complete the reaction is between 1 hour and 24 hours. At the termination of the reaction the desired product, methyl N-(1-alkyl-4-alkoxyprolyl)-α - thiolincosaminide, is recovered from the mixture by evaporating the solvent. The crude material can be purified in a conventional manner, by extraction, recrystallization, chromatography or the like. The product, methyl N-(1-alkyl-4-alkoxyprolyl)-α-thiolincosaminide, is generally isolated as the hydrochloride.

The following examples illustrate the product and process of this present invention, but are not to be construed as limiting.

EXAMPLE 1

*1-carbobenzoxy-trans-4-hydroxy-L-proline benzyl ester*

A mixture of 219 g. of crude 1-carbobenzoxy-trans-4-hydroxy-L-proline, 80 ml. of benzyl alcohol, 300 ml. of benzene and 1 g. of p-toluenesulfonic acid was heated under reflux and the distillate passed through a Dean-Stark distillation head. The reaction mixture was heated for a total of 17 hours during which time an additional 400 mg. of p-toluenesulfonic acid and 100 ml. of benzene were added. Thereafter, the reaction mixture was allowed to cool, benzene was added, and the mixture was extracted with aqueous sodium bicarbonate solution. The aqueous fraction was separated, acidified with hydrochloric acid, and the unesterified proline which was removed was treated again with benzyl alcohol in benzene solution in the presence of p-toluenesulfonic acid. The benzene fractions were combined and the benzene distilled off, giving a total of 219 g. of 1-carbobenzoxy-trans-4-hydroxy-L-proline benzyl ester as an oil.

EXAMPLE 2

*1-carbobenzoxy-cis-4-hydroxy-L-proline benzyl ester*

In the same manner given in Example 1, 1-carbobenzoxy-cis-4-hydroxy-L-proline was esterified with benzyl alcohol in benzene solution in the presence of p-toluenesulfonic acid to give 1-carbobenzoxy-cis-4-hydroxy-L-proline benzyl ester.

EXAMPLE 3

*1-carbobenzoxy-4-hydroxy-D-proline benzyl ester*

In the same manner given in Example 1, 1-carbobenzoxy-cis-4-hydroxy-D-proline was esterified with benzyl alcohol in benzene solution in the presence of p-toluenesulfonic acid to give 1-carbobenzoxy-cis-4-hydroxy-D-proline benzyl ester.

EXAMPLE 4

*1-carbobenzoxy-trans-4-hydroxy-D-proline benzyl ester*

A solution of 0.6 g. of sodium borohydride in 2 ml. of water was added to a solution of 1-carbobenzoxy-4-keto-D-proline (1 gm.) in 30 milliliters of methanol at 0°. The mixture was allowed to stand for 20 hours at 5° C. and the methanol was then removed in vacuo. The residue was treated with 15 ml. of 3 N sodium hydroxide solution at 25° for 30 minutes. The reaction mixture was then cooled to 0°, acidified with concentrated hydrochloric acid and extracted with ethyl acetate. The ethyl acetate was washed 3 times with water and dried over anhydrous magnesium silicate. The ethyl acetate solution was then concentrated and Skellysolve B hexanes was added until a cloudiness persisted. The mixture was cooled and filtered to yield 1-carbobenzoxy-trans-4-hydroxy-D-proline.

This material, dissolved in benzene, was treated with benzyl alcohol in the presence of p-toluenesulfonic acid to give 1-carbobenzoxy-trans-4-hydroxy-D-proline benzyl ester.

In the manner given in Example 1, other prolines can be used in Example 1, such as 1-carbobenzoxy-, 1-(p-bromocarbobenzoxy) and 1-(p-chlorocarbobenzoxy)-; 1-phenyloxycarbonyl- and (1-substituted phenyloxycarbonyl)-4-hydroxy-prolines to give the corresponding 1-hydrocarbyloxycarbonyl-4-hydroxy-proline esters. Instead of benzyl alcohol, other alcohols may be used such as ethyl alcohol, propyl alcohol, isopropyl alcohol, butyl alcohol, isobutyl alcohol, or the like to give the corresponding ethyl, propyl, isopropyl, butyl, isobutyl, or the like ester of 1-hydrocarbyloxycarbonyl-4-hydroxyproline.

EXAMPLE 5

*1-carbobenzoxy-trans-4-ethoxy-L-proline benzyl ester*

To a solution of 1-carbobenzoxy-trans-4-hydroxyl-L-proline benzyl ester (219 g.) in 750 ml. of dimethylformamide was added 372 grams of ethyl iodide and shortly thereafter 462 grams of silver oxide. The mixture was stirred for three days at room temperature (about 25° C.). The reaction mixture was filtered and the residue was washed successively with dimethylformamide and methylene chloride. The filtrate and washings were combined and evaporated in vacuo, leaving a residue which was dissolved in methylene chloride. The methylene chloride solution was washed 3 times with water and dried, and the solvent was distilled to yield 223 grams of 1-carbobenzoxy-trans-4-ethoxy-L-proline benzyl ester.

EXAMPLE 6

*1-carbobenzoxy-trans-4-methoxy-L-proline benzyl ester*

In the same manner given in Example 5, 1-carbobenzoxy-trans-4-hydroxy-L-proline benzyl ester was reacted with methyl iodide and silver oxide in dimethylformamide to give 1-carbobenzoxy-trans-4-methoxy-L-proline benzyl ester.

EXAMPLE 7

*1-carbobenzoxy-cis-4-butoxy-D-proline benzyl ester*

In the same manner given in Example 5, 1-carbobenzoxy-cis-4-hydroxy-D-proline benzyl ester was reacted with butyl iodide and silver oxide in diethyl acetamide to give 1-carbobenzoxy-cis-4-butoxy-D-proline benzyl ester.

EXAMPLE 8

*1-carbobenzoxy-cis-4-octyloxy-L-proline benzyl ester*

In the same manner given in Example 5, 1-carbobenzoxy-cis-4-hydroxy-L-proline benzyl ester was reacted with octyl iodide and silver oxide in dimethylformamide to give 1-carbobenzoxy-cis-4-octyloxy-L-proline benzyl ester.

EXAMPLE 9

*1-carbobenzoxy-trans-4-propoxy-D-proline benzyl ester*

In the same manner given in Example 5, 1-carbobenzoxy-trans-4-hydroxy-D-proline benzyl ester was reacted with propyl iodide and silver oxide in dimethylformamide to give 1-carbobenzoxy-trans-4-propoxy-D-proline benzyl ester.

EXAMPLE 10

*1-carbobenzoxy-trans-4-dodecyloxy-L-proline benzyl ester*

In the same manner given in Example 5, 1-carbobenzoxy-trans-4-hydroxy-L-proline benzyl ester was reacted with dodecyl iodide and silver oxide in dimethylformamide to give 1-carbobenzoxy-tran-4-dodecyloxy-L-proline benzyl ester.

In the same manner given in Example 5, other 1-hydrocarbyloxycarbonyl-4-alkoxyproline alkyl esters are prepared by reacting selected 1-hydrocarbyloxycarbonyl-4-hydroxyproline alkyl esters with an alkyl iodide, an alkyl bromide or an alkyl chloride and silver oxide or silver carbonate to give the desired 1-hydrocarbyloxycarbonyl-4-alkoxyproline alkyl ester. Representative esters so obtained include:

1-carbobenzoxy-cis-4-ethoxy-L-proline benzyl ester,
1-carbobenzoxy-trans-4-pentyloxy-L-proline benzyl ester,
1-carbobenzoxy-trans-4-hexyloxy-L-proline benzyl ester,
1-carbobenzoxy-trans-4-heptyloxy-L-proline benzyl ester,
1-(p-nitrocarbobenzoxy)-cis-4-methoxy-L-proline benzyl ester,
1-(p-chlorocarbobenzoxy)-cis-4-nonyloxy-D-proline benzyl ester,
1-phenyloxycarbonyl-trans-4-decyloxy-L-proline benzyl ester,
1-phenyloxycarbonyl-trans-4-undecyloxy-L-proline benzyl ester,
1-(p-bromocarbobenzoxy)-cis-4-hexyloxy-L-proline benzyl ester,
1-carbobenzoxy-trans-4-propoxy-L-proline ethyl ester,
1-carbobenzoxy-trans-4-propoxy-D-proline butyl ester,
and the like.

EXAMPLE 11

*Trans-4-ethoxy-L-proline and 2,7-diethoxyoctahydro-5H,10H-dipyrrolo[1,2-a:1',2'-d]pyrazine-5,10-dione*

Two grams of 1-carbobenzoxy-trans-4-ethoxy-L-proline benzyl ester in 60 ml. of methanol was shaken under hydrogen (40 pounds pressure) over 0.5 g. of 10% palladium-on-charcoal catalyst for a period of three hours. The mixture was filtered to remove the catalyst and the filtrate was evaporated in vacuo. The crude crystals remaining from the evaporation were dissolved in methanol, the solution was filtered and thereto was added acetonitrile which precipitated trans-4-ethoxy-L-proline. The trans-4-ethoxy-L-proline after recrystallization from methanol melted between 197 and 201° C., rotation $[\alpha]_D$ −46° (c, 0.96, water).

*Analysis.*—Calcd. for $C_7H_{13}NO_3$: C, 52.81; H, 9.23; N, 8.80. Found: C, 52.63; H, 8.46; N, 8.77.

The mother liquors from above were evaporated and the residue thus obtained was recrystallized from ethyl acetate-Skellysolve B to give 2,7-diethoxyoctathydro-5H, 10H-dipyrrolo-[1,2-a:1',2'-d]pyrazine-5,10-dione of melting point 123–125° C.

*Analysis.*—Calcd. for $C_{14}H_{22}N_2O_4$: C, 59.55; H, 7.85; N, 9.92. Found: C, 59.46; H, 7.93; N, 9.83.

EXAMPLE 12

Cis-4-ethoxy-L-proline

In the manner given in Example 11, 3.4 g. of 1-carbobenzoxy-cis-4-ethoxy-L-proline benzyl ester was shaken with hydrogen in the presence of a 10% palladium-on-charcoal catalyst to give 67.6% of cis-4-ethoxy-L-proline of melting point 185–205° C., rotation $[\alpha]_D$ —36° (c, 0.92, water).

EXAMPLE 13

Cis-4-propoxy-D-proline

In the manner given in Example 11, 1-carbobenzoxy-cis-4-propoxy-D-proline benzyl ester was shaken with hydrogen in the presence of palladium-on-charcoal to give cis-4-propoxy-D-proline.

EXAMPLE 14

Trans-4-methoxy-D-proline

In the same manner given in Example 11, 1-carbobenzoxy-trans-4-methoxy-D-proline was shaken with hydrogen in the presence of a palladium-on-charcoal catalyst to give trans-4-methoxy-D-proline.

In the same manner given in Example 11, other 4-alkoxy-prolines can be obtained by shaking with hydrogen 1-hydrocarbyloxycarbonyl-4-alkoxyproline benzyl esters in the presence of a palladium catalyst. Representative 4-alkoxyprolines thus obtained include trans-4-ethoxy-D-proline, cis-4-ethoxy-D-proline, trans-4-hexyloxy-L-proline, trans-4-heptyloxy-L-proline, cis-4-methoxy-L-proline, cis-4-methoxy-D-proline, trans-4-methoxy-L-proline, trans-4-undecyloxy-L-proline, trans-4-dodecyloxy-L-proline, cis-4-hexyloxy-L-proline, cis-4-propoxy-L-proline, trans-4-propoxy-D-proline, and the like.

EXAMPLE 15

1-methyl-trans-4-ethoxy-L-proline

A mixture of trans-4-ethoxy-L-proline (3.75 g.), 3.0 g. of 10% palladium-on-charcoal catalyst, 3.5 ml. of formalin and 150 ml. of methanol was shaken with hydrogen (40 pounds pressure) for four hours. The mixture was filtered to remove the catalyst and the filtrate was evaporated to dryness in vacuo. Benzene was added to the residue, and the solution was evaporated in vacuo to yield a crystalline residue which was dissolved in methanol. After filtering the solution, ether was added to it, precipitating 2.7 g. of crystalline 1-methyl-trans-4-ethoxy-L-proline of melting point 117 to 119 and rotation $[\alpha]_D$ —69° (c, 0.93, water).

*Analysis.*—Calcd. for $C_8H_{15}NO_3$: C, 55.46; H, 8.73; N, 8.09. Found: C, 55.39; H, 8.85; N, 8.08.

EXAMPLE 16

1-methyl-cis-4-ethoxy-L-proline

In the manner given in Example 15, cis-4-ethoxy-L-proline was reductively alkyated in the presence of formalin to give 1-methyl-cis-4-ethoxy-L-proline of melting point 161–164° C. which after an additional recrystallization from methanolethyl acetate had a melting point of 164–165° C. and a rotation $[\alpha]_D$ —61° (c, 0.93 water).

*Analysis.*—Calcd. for $C_8H_{15}NO_3$: C, 55.46; H, 8.73; N, 8.09. Found: C, 56.05; H, 9.02; N, 8.10.

A portion of the thus-obtained 1-methyl-cis-4-ethoxy-L-proline which was converted to the hydrochloride and recrystallized from methanol-ether had a melting point of 141–143° C.

*Analysis.*—Calcd. for $C_8H_{15}NO_3 \cdot HCl$: C, 45.82; H, 45.82; H, 7.69; N, 6.69. Found: C, 46.00; H, 7.52; N, 7.01.

EXAMPLE 17

1-ethyl-trans-4-ethoxy-L-proline

In the manner given in Example 15, trans-4-ethoxy-L-proline was shaken with hydrogen in the presence of acetaldehyde to give 1-ethyl-trans-4-ethoxy-L-proline.

EXAMPLE 18

1-isopropyl-cis-4-propoxy-L-proline

In the manner given in Example 15, cis-4-propoxy-L-proline was shaken with hydrogen in the presence of acetone to give 1-isopropyl-cis-4-propoxy-L-proline.

EXAMPLE 19

1-(1-pentylhexyl)-cis-4-methoxy-D-proline

In the manner given in Example 15, cis-4-methoxy-L-proline was shaken with hydrogen in the presence of dipentyl ketone to give 1-(1-pentylhexyl)-cis-4-methoxy-D-proline.

EXAMPLE 20

1-(sec-butyl)-trans-4-ethoxy-L-proline

In the manner given in Example 15, trans-4-ethoxy-L-proline was shaken with hydrogen in the presence of methyl ethyl ketone to give 1-(sec-butyl)-trans-4-ethoxy-L-proline.

In the manner given in Example 15, 1-alkyl-4-alkoxyprolines can be produced by shaking with hydrogen a selected 4-alkoxyproline in the presence of a selected aldehyde or ketone containing up to and including 12 carbon atoms. Representative 1-alkyl-4-alkoxyprolines thus obtained include 1-butyl-trans-4-pentyloxy-L-proline,
1-hexyl-trans-4-hexyloxy-L-proline,
1-octyl-trans-4-ethoxy-L-proline,
1-(1-ethylpropyl)-cis-4-methoxy-L-proline,
1-undecyl-cis-4-nonyloxy-D-proline,
1-(1-ethylbutyl)-trans-4-dodecyloxy-L-proline,
1-(1-butylpentyl)-cis-4-undecyloxy-L-proline,
1-undecyl-cis-4-hexyloxy-L-proline,
1-pentyl-cis-4-hexyloxy-L-proline,
1-butyl-cis-4-propoxy-L-proline,
1-heptyl-trans-4-propoxy-D-proline,
1-dodecyl-4-cis-ethoxy-L-proline, and the like.

EXAMPLE 21

Methyl N-(1-methyl-trans-4-ethoxy-L-prolyl)-α-thiolincosaminide hydrochloride To a solution of 5.2 g. of 1-methyl-trans-4-ethoxy-L-proline in 200 ml. of acetonitrile was added 4.9 ml. of diethylamine and 4.1 ml. of isobutylchloroformate at 0° C. The reaction mixture was stirred at 0° C. for 0.25 hours and then a solution of 10.95 g. of methyl α-thiolincosaminide [S.N. 276,568, filed April 29, 1963] in 150 ml. of water was added at 0° C. with stirring during a period of one hour. Stirring was continued at room temperature for a period of 7 hours. The acetonitrile was then evaporated in vacuo. The thus-obtained residue was diluted with water and treated with two 30-g. portions of Dowex-2 (OH form). The resin was removed by filtration and the filtrate was lyophilized. The dried residue was shaken with 500 ml. of acetone and filtered. The filtrate was acidified with dilute hydrochloric acid to precipitate methyl N-(1-methyl-trans-4-ethoxy-L-prolyl)-α-thiolincosaminide hydrochloride which crystallized on standing. Recrystallization from water-acetone gave 7.79 g. (66.6%) of methyl N-(1-methyl-trans-4-ethoxy-L-prolyl)-α-thiolincosaminide hydrochloride, M.P. 150–160° C. (solvated form). Second recrystallization yielded a hydrated form of methyl N-(1-methyl-trans-4-ethoxy-L-prolyl)-α-thiolincosaminide hydrochloride, M.P. 170–175° C. with decomposition; rotation $[\alpha]_D$ 145° (c, 0.99, water); water 2.53%. The quantitative analysis was performed with the hydrated sample and corrected for water.

*Analysis.*—Calcd. for $C_{17}H_{32}N_2O_7S \cdot HCl$: C, 45.88; H, 7.48; N, 6.30; S, 7.21. Found: C, 45.84; H, 7.74; N, 6.05; S, 7.27.

EXAMPLE 22

*Methyl N-(1-methyl-cis-4-ethoxy-L-prolyl)-α-thiolincosaminide hydrochloride*

In the manner given in Example 21, 1-methyl-cis-4-ethoxy-L-proline and methyl α-thiolincosaminide gave a yield of methyl N-(1-methyl-cis-4-ethoxy-L-prolyl)-α-thiolincosaminide hydrochloride hydrate having a melting point of 141–146° C. after recrystallization from acetone-water.

*Analysis.*—Calcd. for $C_{17}H_{32}NO_7S \cdot HCl \cdot H_2O$: C, 44.10; H, 7.60; N, 6.05; S, 6.92; $H_2O$, 3.89. Found: C, 44.53; H, 7.85; N, 6.20; S, 6.76; $H_2O$, 4.64.

EXAMPLE 23

*Methyl N-(1-methyl-trans-4-ethoxy-D-prolyl)-α-thiolincosaminide hydrochloride*

In the manner given in Example 21, 1-methyl-trans-4-ethoxy-D-proline and methyl α-thiolincosaminide yielded methyl N - (1 - methyl-trans-4-ethoxy-D-prolyl)-α-thiolincosaminide·HCl.

EXAMPLE 24

*Methyl N-(1-methyl-cis-4-ethoxy-D-prolyl)-α-thiolincosaminide hydrochloride*

In the manner given in Example 21, 1-methyl-cis-4-ethoxy-D-proline and methyl α-thiolincosaminide gave methyl N - (1-methyl-cis-4-ethoxy-D-prolyl)-α-thiolincosaminide hydrochloride.

EXAMPLE 25

*Methyl N-(1-ethyl-trans-4-butoxy-L-prolyl)-α-thiolincosaminide hydrochloride*

In the manner given in Example 21, 1-ethyl-trans-4-butoxy-L-proline and methyl α-thiolincosaminide gave methyl N - (1-ethyl-trans-4-butoxy-L-prolyl)-α-thiolincosaminide hydrochloride.

EXAMPLE 26

*Methyl N-(1-butyl-trans-4-hexyloxy-L-prolyl)-α-thiolincosaminide hydrochloride*

In the manner given in Example 21, 1-butyl-trans-4-hexyloxy-L-proline and methyl α-thiolincosaminide gave methyl N - (1-butyl-trans-4-hexyloxy-L-prolyl)-α-thiolincosaminide·HCl.

In the manner given in Example 21, other methyl N-(substituted prolyl)-α-thiolincosaminides can be produced by reacting a selected 1-alkyl-4-alkoxyproline and methyl α-thiolincosaminide to give the corresponding methyl N-(1 - alkyl - 4 - alkoxyprolyl)-α-thiolincosaminide. Representative methyl N-(1-alkyl-4-alkoxy-prolyl)-α-thiolincosaminides thus obtained as hydrochloride include:

methyl N-(1-hexyl-trans-4-octyloxy-L-prolyl)-α-thiolincosaminide,
methyl N-(1-octyl-trans-4-decyloxy-L-prolyl)-α-thiolincosaminide,
methyl N-(1-methyl-trans-4-undecyloxy-L-prolyl)-α-thiolincosaminide,
methyl N-(1-propyl-trans-4-ethoxy-D-prolyl-)-α-thiolincosaminide,
methyl N-(1-isopropyl-cis-4-butoxy-L-prolyl)-α-thiolincosaminide,
methyl N-(1-ethyl-cis-4-nonyloxy-D-propyl)-α-thiolincosaminide,
methyl N-(1-dodecyl-trans-4-heptyloxy-L-prolyl)-α-thiolincosaminide,
methyl N-(1-butyl-cis-4-methoxy-L-prolyl)-α-thiolincosaminide,
methyl N-(1-decyl-trans-4-hexyloxy-D-prolyl)-α-thiolincosaminide,
methyl N-(1-heptyl-cis-octyloxy-D-prolyl)-α-thiolincosaminide,
methyl N-(1-ethyl-trans-4-propoxy-D-prolyl)-α-thiolincosaminide, and the like hydrochlorides.

All these hydrochlorides can be converted to the free amines by standard procedures such as treating these compounds in aqueous solution with a base and extracting with a water-immiscible solvent and evaporating the extracts:

EXAMPLE 27

*Methyl N-(1-methyl-trans-4-ethoxy-L-prolyl)-α-thiolincosaminide*

One gram of methyl N-(1-methyl-trans-4-ethoxy-L-prolyl)-α-thiolincosaminide, dissolved in 20 ml. water, was treated with a 5% aqueous solution of sodium hydroxide until the pH was 10. The reaction mixture was then extracted with two portions of 25-milliliters each of methylene chloride, the extract was dried over anhydrous sodium sulfate and evaporated. The thus-obtained residue was recrystallized twice from methylene chloride to give methyl N - (1 - methyl - trans - 4 - ethoxy-L-prolyl)-α-thiolincosaminide.

In the same manner methyl N-(1-methyl-cis-4-ethoxy-L-prolyl)-α-thiolincosaminide was produced from its hydrochloride.

I claim:

1. A methyl N-(1-alkyl-4-alkoxypropyl)-α-thiolincosaminide of the formula:

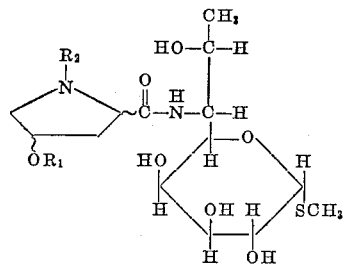

wherein $R_1$ and $R_2$ are alkyl radicals having from 1 to 12 carbon atoms, inclusive.

2. Methyl N - (1 - methyl-trans-4-ethoxy-L-prolyl)-α-thiolincosaminide.

3. Methyl N - (1 - methyl-cis-4-ethoxy-L-prolyl)-α-thiolincosaminide.

4. 1-alkyl-4-alkoxyproline of the formula:

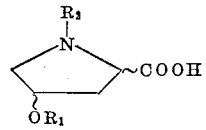

wherein $R_1$ and $R_2$ are alkyl radicals having from 1 to 12 carbon atoms, inclusive.

5. 1-methyl-trans-4-ethoxy-L-proline.
6. 1-methyl-cis-4-ethoxy-L-proline.
7. A process for the production of a compound of the formula:

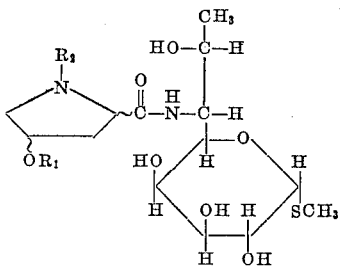

wherein $R_1$ and $R_2$ are alkyl radicals having from 1 to 12 carbon atoms, inclusive, which comprises: esterifying a 1-hydrocarbyloxycarbonyl-4-hydroxyproline of the formula:

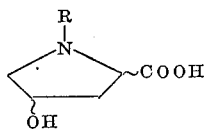

wherein R is selected from the group consisting of benzyloxy-carbonyl of the formula:

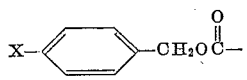

in which X is selected from the group consisting of hydrogen, nitro, methoxy, chloro and bromo, and phenyl-oxy-carbonyl of the formula:

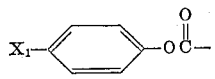

in which $X_1$ is selected from the group consisting of hydrogen and alkyl containing from 1 to 4 carbon atoms, inclusive, with benzyl alcohol in the presence of an acid catalyst to obtain the benzyl ester of the 1-hydrocarbyloxycarbonyl-4-hydroxyproline; treating this ester with a selected alkyl halide wherein the alkyl group has from 1 to 12 carbon atoms, inclusive, and silver oxide to obtain the corresponding 1 - hydrocarbyloxycarbonyl - 4 - alkoxyproline ester; hydrogenolyzing the said alkoxyproline in the presence of a palladium catalyst to obtain a mixture of a 4-alkoxyproline and a 2,7-dialkoxyoctahydro - 5H,10H-dipyrrolo(1,2-a:1',2'-d)pyrazine-5,10-dione; separating the 4-alkoxyproline from the mixture; subjecting the 4-alkoxyproline to reductive alkylation with a carbonyl compound of the formula

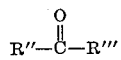

wherein R'' and R''' are selected from the group consisting of hydrogen and alkyl in which the total number of carbon atoms of the alkyl groups is up to and including 11 carbon atoms in the presence of a palladium catalyst to obtain the corresponding 1-alkyl-4-alkoxyproline of the formula

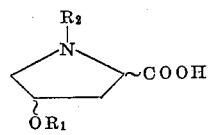

wherein $R_1$ and $R_2$ have the same significance as hereinabove, and treating this proline with isobutylchloroformate in the presence of triethylamine and with methyl α-thiolincosaminide to obtain the corresponding methyl-N-(1-alkyl-4-alkoxyprolyl)-α-thiolincosaminide of the formula above.

8. The process of claim 7 wherein the starting material is 1-carbobenzoxy-trans-4-hydroxy-L-proline, the etherifying agent is ethyl iodide, the carbonyl compound is formaldehyde, and the final product is methyl N-(1-methyl-trans-4-ethoxy-L-prolyl)-α-thiolincosaminide.

9. The process of claim 7 wherein the starting material is 1-carbobenzoxy-cis-4-hydroxy-L-proline, the etherifying agent is ethyl iodide, the carbonyl compound is formaldehyde, and the final product is methyl N-(1-methyl-cis-4-ethoxy-L-prolyl)-α-thiolincosaminide.

No references cited.

LEWIS GOTTS, *Primary Examiner.*

JOHNNIE R. BROWN, *Assistant Examiner.*